United States Patent
Nicholls et al.

[11] Patent Number: 6,138,040
[45] Date of Patent: Oct. 24, 2000

[54] METHOD FOR SUPPRESSING SPEAKER ACTIVATION IN A PORTABLE COMMUNICATION DEVICE OPERATED IN A SPEAKERPHONE MODE

[75] Inventors: Richard Brent Nicholls, Sunrise; Scott David Koenigsman, Plantation, both of Fla.

[73] Assignee: Motorola, Inc., Schaumburg, Ill.

[21] Appl. No.: 09/127,692

[22] Filed: Jul. 31, 1998

[51] Int. Cl.[7] .................................................. H04Q 1/38
[52] U.S. Cl. ................................. 455/569; 379/390
[58] Field of Search ........................ 455/569, 79, 63; 379/388, 389, 390

[56] References Cited

U.S. PATENT DOCUMENTS

| | | | |
|---|---|---|---|
| 5,230,089 | 7/1993 | Kindlinger et al. | 455/79 |
| 5,598,466 | 1/1997 | Graumann | 379/389 |
| 5,771,440 | 6/1998 | Sukhu et al. | 455/63 |
| 5,867,574 | 2/1999 | Eryilmaz | 455/79 |
| 5,881,373 | 3/1999 | Elofsson et al. | 455/67.1 |

*Primary Examiner*—Daniel S. Hunter
*Assistant Examiner*—Myron K. Wyche
*Attorney, Agent, or Firm*—Scott M. Garrett

[57] ABSTRACT

In a portable communication device (100) operated in a speakerphone mode, when no speech is present in either the outbound signal received from a communication system, the speaker (114) of the communication device is muted and the microphone (120) activated. When speech is detected in an inbound signal (202, 204, 206), and speech is also subsequently detected in the outbound signal (214), the speaker is left inactivated and the microphone kept in an activated state. To determine if speech is present in the inbound signal, the inbound signal is voided, providing a succession of frames (206), each frame having a frame energy parameter and a background noise parameter (208). If the frame energy of a given frame sufficiently exceeds the an average background noise value for the given frame, then speech is declared present. To smooth this half duplex operation, a timer may be used so that brief periods of silence or fricative parts of speech do not result in a revocation of the declaration of speech in the inbound signal.

7 Claims, 3 Drawing Sheets

METHOD FOR SUPPRESSING SPEAKER ACTIVATION IN A PORTABLE COMMUNICATION DEVICE OPERATED IN A SPEAKERPHONE MODE

CROSS REFERENCE

This application is related to application entitled "Method And Apparatus For Providing Speakerphone Operation In A Portable Communication Device", and having U.S. patent application Ser. No. 09/127,348; application entitled "A Method For Selectively Including Leading Fricative Sounds In A Portable Communication Device Operated In A Speakerphone Mode", and having U.S. patent application Ser. No. 09/127,536, and to application entitled "Method For Detecting Speech In A Vocoded Signal", and having U.S. patent application Ser. No. 09/127,925, all of said applications being commonly assigned with the present application and filed evenly herewith.

TECHNICAL FIELD

This invention relates in general to portable communication devices and communication systems for same, and more particularly to portable communication devices operable in a speakerphone mode.

BACKGROUND OF THE INVENTION

Speakerphones have gained widespread acceptance in the market place, and are used by a majority of businesses to facilitate communications. Speakerphones have also become prominent in many consumer markets where they are used as "hands free" phones. However, speakerphones are primarily used in land line communication systems where a regular telephone speaker circuit is replaced by a more powerful one, and a high gain microphone and accompanying circuit is used instead of a conventional circuit. The more powerful speaker and more sensitive microphone are typically used in conjunction with some means for mitigating when these respective components are active.

As of the present time, few manufactures have successfully designed a mobile speakerphone, despite the obvious desirability of such a device. That is, a portable communication device, such as a cellular telephone, that is capable of operating in a speakerphone mode. The reasons why such a device has not been successful are numerous and varied. One of the strongest reasons is that a speakerphone, by necessity, requires a more powerful audio output circuit over a conventional cellular phone. A more powerful speaker typically means more weight and volume, which goes against the goals of portable communication device manufactures. Furthermore, a more powerful speaker could cause a problem if placed in a conventional earpiece location since then there is the risk that a user holding the phone close to their ear, believing the phone to be in a standard mode, could be injured as the result of loud audio being played instead. Consequently, a safe approach is to use a conventional speaker for standard phone mode in the conventional location, a place the more powerful speaker elsewhere in the phone, away from the conventional earpiece location. A second reason why speakerphone implementation is difficult in a portable communication device is the close proximity between the speaker and microphone. If the dual speaker strategy suggested above is used, this is even more problematic since, in general, the portion of the phone where the microphone is located is the farthest away from the earpiece. In order for the speakerphone to sound acceptable, it must mitigate between the speaker and microphone very quickly to avoid clipping out portions of speech, or the user must get used to waiting longer than normal before speaking. To get around this problem in using mobile communications, external devices are used, coupled to the portable communication device as an accessory, that are designed very similarly to conventional land line speakerphones. However these are often worse than conventional speakerphones, depending on ambient noise levels.

Because of the obstacles recited above, and others, the design of a portable communication device operable in a speakerphone mode has proven extremely difficult. One of the key determinations to be made in providing speakerphone operation is when to activate the speaker and mute the microphone, and vice-versa. In other words, activating the speaker only when voice information is being received, muting the speaker otherwise. However, it is also true that if the user of the device is speaking, the speaker should be muted so that the microphone will remain on while the user is speaking. Otherwise the remote party listening to the user will have portions of the user's speech cut out. In other words, if a user is speaking, and a signal is received from the remote party that would ordinarily be played as voice over the device's speaker, if the signal is played, resulting in the microphone being muted, resulting in anything said by the user being omitted during that time. Therefore there is a need in a portable communication device operated in a speakerphone mode, for a means to suppress activation of the speaker while the user of the device is speaking.

DETAILED DESCRIPTION OF A PREFERRED EMBODIMENT

Figure 1:
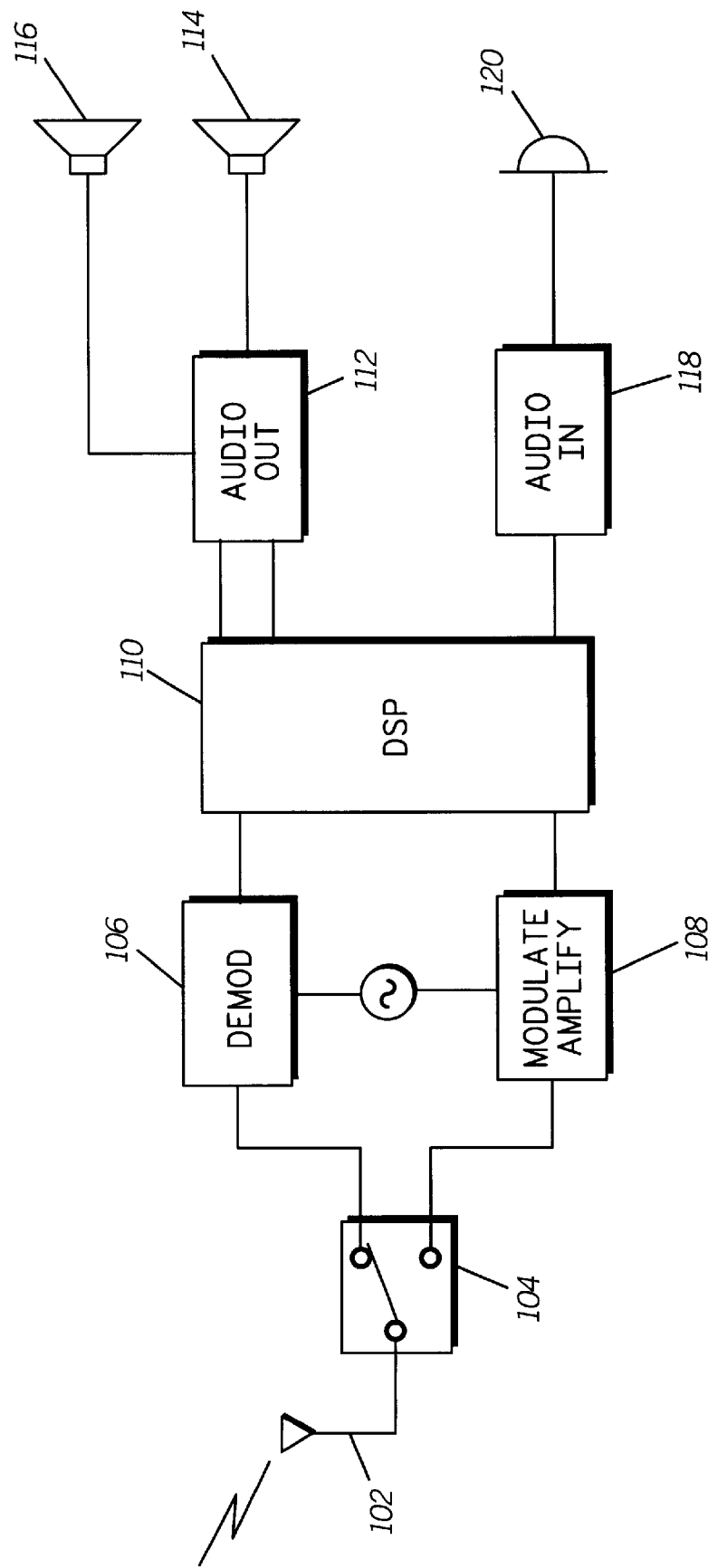
FIG. 1 shows a block diagram of a portable communication device operable in a speakerphone mode, in accordance with one embodiment of the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of activating a speaker when a user is talking by detecting speech in an inbound audio signal, and suppressing activation of the speaker when voice is detected in inbound audio signal. Referring now to FIG. 1, there is shown a block diagram of a portable communication device 100 operable in a speakerphone mode, in accordance with one embodiment of the invention. The device comprises an antenna 102 coupled to an antenna switch 104, as is common in the art. The antenna switch selectively couples the antenna to either a receiver 106 or a transmitter 108. The antenna and receiver form a means for receiving radio frequency (RF) signals, while the antenna and the transmitter form a means for transmitting RF signals. Both the receiver and transmitter are coupled to a digital signal processor (DSP) 110. In the preferred embodiment the DSP is a monolithic integrated circuit having digital computation means and programmability, as is known in the art. The DSP performs the tasks of vocoding and speech detection, for example. By vocoding it is meant that sampled speech signal from the microphone are encoded according to, for example, vector sum excited linear predictive (VSELP) coding. Vocoding is used to compress sampled speech into a small group of symbols and parameters for compression. The original speech wave form can be replicated from the symbols and parameters. Among the various parameters that may be provided, there is a frame energy value for each frame of speech. Each frame represents typically on the order of 30 milliseconds of speech. The frame energy value is computed by the vocoder, here the DSP, by evaluating the autocorrelation function at the zeroeth position. Another parameter generated by vocoding is some measure of background noise. In VSELP a comfort noise value is generated which is indicative of background noise.

The DSP also decodes received vocoded signals, referred to as outbound signals since they are typically outbound from some fixed equipment of a communication system. For speakerphone operation, the DSP analyzes the received outbound signal to determine if speech is present. There are numerous ways to do so, but the preferred method is taught in a co-pending patent application titled "Method And Apparatus For Providing Speakerphone Operation In A Portable Communication Device", and having U.S. patent application Ser. No. 09/127,348, which is hereby incorporated by reference.

The portable communication device further comprises an audio-out circuit 112 coupled to the DSP, for playing audio data received from the DSP over a first speaker 114. In the preferred embodiment, there is also a second speaker 116, and the first speaker is used for playing audio at a speakerphone volume while the second speaker is used for playing audio at a telephone earpiece volume.

An audio-in circuit 118 is also included, coupled to the DSP and a microphone 120. When a user speaks, the microphone converts the acoustic signal to an electric signal, which is amplified, conditioned, and sampled by the audio-in circuit, providing the DSP with a sampled audio signal. The sampled audio signal is also referred to as an inbound audio signal.

Figure 2:
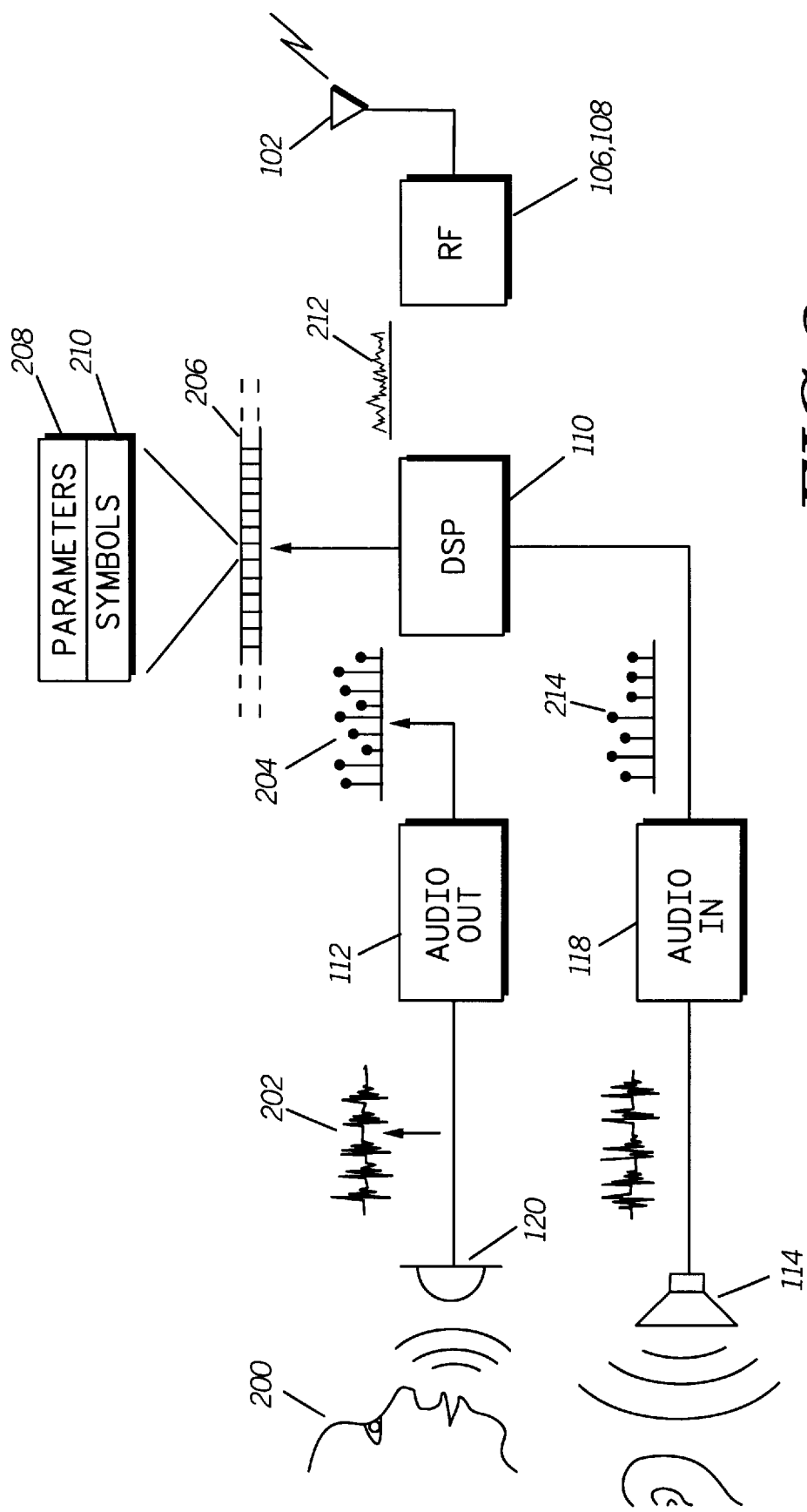
FIG. 2 shows a signal flow diagram of a portable communication device in accordance with the invention.

The overall process of what happens in the communication device is shown in FIG. 2. Reading from left to right, a user 200 produces speech, which is converted into an electrical signal 202. The audio-in circuit 118 produces a sampled inbound audio signal 204. The DSP vocodes the sampled inbound audio signal into a succession of frames 206, each frame having several parameters, such as a frame energy value and a background noise value, and symbols 210 representing speech patterns. The DSP further converts baseband processing to provide a baseband signal 212 to the RF circuitry (106, 108), which converts the baseband signal into an RF signal and transmits the RF signal from an antenna 102.

Receiving an outbound signal works in the opposite direction. An RF signal is received at the antenna, which is demodulated, to provide a baseband signal provided to the DSP, the DSP performs baseband processing to obtain a vocoded outbound signal comprising a succession of frames, as described above. It should be noted that, since this is a telephony system, frames are processed in real time, as they are received/generated for both outbound and inbound signals. Continuing, the DSP provides a sampled outbound audio signal 214 to the audio-out circuit 112, which produces an electrical signal played over a speaker 114 for the user to hear.

In operating in a speakerphone mode, the communication device operates in a half duplex manner. When outbound speech content is played over the speaker, the microphone is muted to avoid echo. However, if this manner of operating is followed strictly, when the user is talking and outbound speech content is received, the speaker will "break through", muting the microphone. The remote party to whom the user is speaking will hear portions of the user's speech clipped out, likely without realizing why. This can be an annoyance since, while the remote party may not be speaking, background noise at the remote party's end may be processed as speech, causing the clipping.

Figure 3:
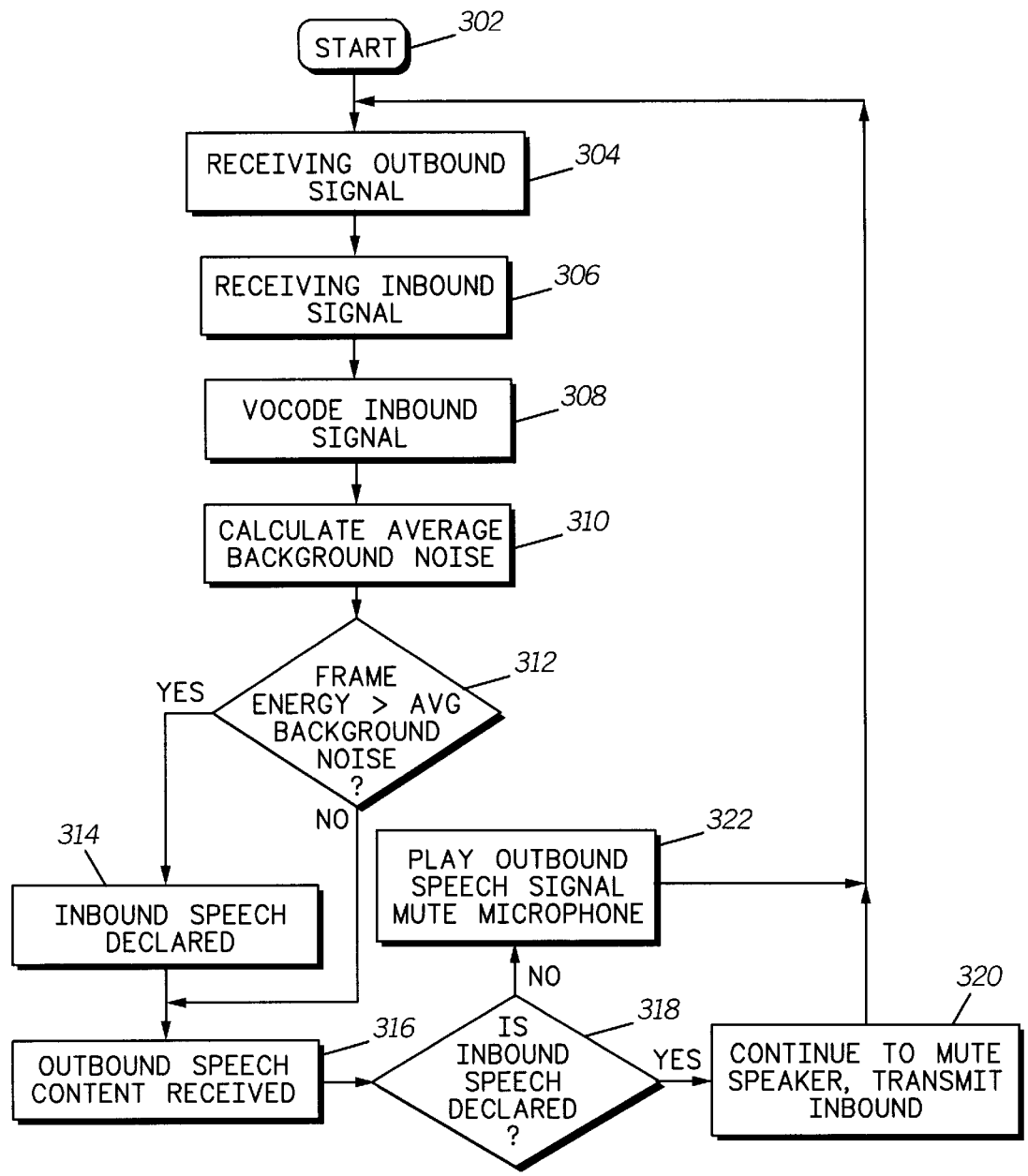
FIG. 3 shows a flow chart diagram of a method for suppressing speaker activation in a portable communication device operated in a speakerphone mode.

To obviate the problem of speaker break-through and the associated clipping, it is desirable to suppress speaker activation while the user is speaking. The preferred method of suppressing the speaker is represented in FIG. 3, which shows a flow chart diagram 300 for a method for suppressing speaker activation. At the start 302 the communication device has been configured to operate in a speakerphone mode, and a call between the user and a remote party has been established. Consequently, the communication device is receiving (304) an outbound audio signal from a wireless source. In this example, the DSP processes the outbound signal, determining that the outbound audio signal does not contain speech information, thus the speaker will be muted, with the microphone active. While no speech content is being received in the outbound signal, the user begins speaking resulting in receiving an inbound audio signal (306) at the microphone of the portable communication device. The DSP will begin vocoding the inbound audio signal (308) to provide an inbound vocoded signal comprising of a succession of frames, each frame of the succession of frames having a frame energy value and a background noise value. For each successive frame, the DSP performs calculating an average background noise value (310) for each frame of the succession of frames. In other words, since each frame is processed in succession, each new frame potentially results in a new average background noise value. The averaging may be performed in a conventional manner. The DSP then performs a comparison step (312) for each successive frame, comparing the frame energy of each frame with the average background noise value corresponding to that frame. If the frame energy value is sufficiently greater than the background noise, then it is determined that speech is present. By sufficiently greater, it is meant that a minimum difference has been determined, preferably by routine experimentation, to define a threshold above the average noise value. If the frame energy is above the average noise value plus the threshold, then it is deemed sufficiently greater.

In the preferred embodiment, when speech is declared present, a flag is set to indicate such. Upon determining that speech is present (314) in a given frame of the succession of frames, in the preferred embodiment, a flag is set to declare speech present in the inbound signal. Since the method discussed is a method to suppress speaker activation, in the present example, sometime after the user begins speaking, and while the user is still speaking (speech still declared), the DSP begins detecting speech information in the outbound audio signal (316) from the remote party. To determine what to do, the DSP checks the flag indicating if inbound speech is still present (318). If speech is still present, or declared to be present, then preventing activation of the speaker (320) takes place. The speaker will be muted, and the microphone left active. If speech is not present, or otherwise indicated, then the audio-out circuit will play the outbound audio information as usual, muting the microphone at the same time to prevent echo. In practice, the step of muting the speaker is easily accomplished by simply not sending any audio data to the audio-out circuit. Furthermore, in the preferred embodiment, the vocoding is VSELP coding, and the background noise value used will be the comfort noise value produced in accordance with VSELP coding.

Since only frame energy is used, from one frame to the next, the frame energy may vary significantly, and fall below the average background noise value. This could result in break-through, if outbound speech content were present, at the onset of a typical pause in speech or a fricative portion of speech, even though the user is not finished speaking. In the preferred embodiment, to prevent this from happening, a staggered average value derived from the frame energy will be calculated. The staggered average is calculated by setting the staggered average value equal to the frame energy if the frame energy exceeds a prior staggered average value, or reduced by an averaging factor if the frame energy is below the previous staggered average value.

To further prevent unwanted break-through from happening the DSP begins a timer every time the staggered average value drops below the threshold after speech has been detected in the inbound signal. The timer runs for a preselected duration, during which inbound speech will continue to be declared. The timer is reset every time an inbound frame is determined to contain speech information. If the timer expires before another inbound frame is found to be sufficiently energetic to indicate speech, then the declaration of inbound speech is revoked, and outbound speech may be played, if any is present, or if any is received while no inbound speech is declared present.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for suppressing speaker activation in a portable communication device operated in a speakerphone mode, comprising the steps of:

receiving an outbound audio signal from a wireless source;

determining that the outbound audio signal does not contain speech information;

muting the speaker;

receiving an inbound audio signal at a microphone of the portable communication device;

vocoding the inbound audio signal to provide an inbound vocoded signal comprising of a succession of frames, each frame of the succession of frames having a frame energy value and a background noise value;

calculating an average background noise value for each frame of the succession of frames;

calculating a staggered average value of the frame energy;

comparing the staggered average value of the frame energy with the average background noise value;

determining that speech is present in a given frame of the succession of frames if the staggered average value of the frame energy is sufficiently greater then the average background noise value; and preventing activation of the speaker while performing the step of determining that speech is present in the inbound audio signal while, subsequent to performing the step of determining, detecting speech information in the outbound audio signal.

2. A method for suppressing speaker activation as defined in claim 1, wherein in the step of vocoding, the background noise value is a comfort noise value.

3. A method for suppressing speaker activation as defined in claim 1, wherein the step of preventing activation is performed for a preselected period of time after speech is no longer present in the inbound audio signal.

4. A method for activating a speaker in a portable communication device operated in a speakerphone mode, the speaker normally muted, the method comprising the steps of:

vocoding an inbound audio signal to provide a succession of frames, each frame of the succession of frames having a frame energy value and a background noise value;

calculating an average background noise value for each frame of the succession of frames;

calculating a staggered average value of the frame energy;

detecting an inbound voice content in the inbound audio signal when the staggered average value of the frame energy exceeds the average background noise value;

receiving a radio frequency signal;

detecting an outbound voice signal in the radio frequency; and playing the outbound voice signal over the speaker only when not performing the step of detecting an inbound voice signal and while performing the step of detecting an outbound voice signal.

5. A method for activating a speaker as defined in claim 4, wherein the step of detecting an inbound voice content comprises determining that the frame energy of a given frame of the succession of frames is higher than the average background noise value corresponding to the given frame.

6. A method for activating a speaker as defined in claim 4, wherein in the step of vocoding, the background noise value is a comfort noise value.

7. A method for activating a speaker as defined in claim 4, wherein, in the step of playing the outbound voice signal, if the inbound voice content is detected prior to detecting the outbound voice content, waiting a preselected period of time after the inbound voice signal is detected before playing the outbound voice signal.

* * * * *